United States Patent
Kim et al.

(10) Patent No.: US 9,319,510 B2
(45) Date of Patent: Apr. 19, 2016

(54) PERSONALIZED BANDWIDTH EXTENSION

(71) Applicant: Qualcomm Incorporated, San Diego, CA (US)

(72) Inventors: Lae-Hoon Kim, San Diego, CA (US); Sang-Uk Ryu, San Diego, CA (US); Jongwon Shin, Gwangju (KR)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 13/768,946

(22) Filed: Feb. 15, 2013

(65) Prior Publication Data

US 2014/0233725 A1    Aug. 21, 2014

(51) Int. Cl.
| | |
|---|---|
| H04M 1/76 | (2006.01) |
| H04M 3/22 | (2006.01) |
| H04M 9/08 | (2006.01) |
| G10L 21/038 | (2013.01) |
| G10L 17/00 | (2013.01) |

(52) U.S. Cl.
CPC ............... *H04M 3/22* (2013.01); *G10L 21/038* (2013.01); *H04M 9/08* (2013.01); *G10L 17/00* (2013.01)

(58) Field of Classification Search
CPC ........ H04B 1/1036; H04B 1/001; H04B 1/40; H04B 10/40; H04B 17/005; H04B 17/0077; H04B 17/025; H04B 1/71637; H04B 1/719; H04B 3/466; H04B 1/642; H04B 3/4936; H04B 15/61; H04B 15/62; H04B 15/66; H04B 15/8016; H04B 2215/7414; H04B 7/006; H04B 1/582; G10L 19/24; H04L 47/70; H04L 12/14; H04L 47/10; H04L 12/5602; H04L 2012/5625; H04L 45/245; H04L 12/44; H04L 29/06027; H04W 36/0011; H04W 4/26; H04W 36/30; H04W 28/04; H04Q 3/0091; H04Q 3/66; H04Q 11/0478; H04M 1/642; H04M 3/4936; H04M 15/61; H04M 15/62; H04M 15/66; H04M 15/8016; H04M 2215/7414; H04M 7/006; H04M 3/36; H04M 15/00

USPC ................ 379/414, 114.07, 112.04–112.07, 379/114.06–114.08, 221.07; 370/229–240, 370/332, 333, 352–356, 391, 395.21, 395.4, 370/498

See application file for complete search history.

(56) References Cited

U.S. PATENT DOCUMENTS

| | | | | |
|---|---|---|---|---|
| 6,144,244 | A * | 11/2000 | Gilbert .................. | H03G 7/001 327/350 |
| 2003/0009327 | A1 * | 1/2003 | Nilsson et al. ............... | 704/219 |
| 2003/0050786 | A1 * | 3/2003 | Jax ........................ | G10L 21/038 704/500 |
| 2006/0190254 | A1 * | 8/2006 | Iser ....................... | G10L 21/038 704/243 |
| 2008/0215322 | A1 * | 9/2008 | Fischer et al. ............... | 704/243 |
| 2008/0300866 | A1 * | 12/2008 | Mukhtar ................ | G10L 21/038 704/205 |
| 2011/0153318 | A1 * | 6/2011 | Rossello ................ | G10L 21/038 704/208 |
| 2013/0151255 | A1 * | 6/2013 | Kim ........................ | G10L 19/02 704/268 |
| 2013/0157674 | A1 * | 6/2013 | Jylha-Ollila ............ | H04W 8/24 455/450 |
| 2014/0288925 | A1 * | 9/2014 | Sverrisson ............ | G10L 21/038 704/206 |

OTHER PUBLICATIONS

Epps J et al., "A New Technique for Wideband Enhancement of Coded NarrowbandSpeech", Speech Coding Proceedings, 1999 IEEE Workshop on PORVOO, Finland Jun. 23-28, 1999, Piscataway, NJ, USA, IEEE, us, Jun. 28, 1999 (1999-86-28), pp. 174-176, XP818345554, DOI: 18.1189/SCFT.1999.781522, ISBN: 978-8-7883-5651-1.

International Search Report and Written Opinion—PCT/US2014/015852—ISA/EPO—May 12, 2014.

* cited by examiner

*Primary Examiner* — Akelaw Teshale
(74) *Attorney, Agent, or Firm* — Austin Rapp & Hardman (57) ABSTRACT

A personalized (i.e., speaker-derivable) bandwidth extension is provided in which the model used for bandwidth extension is personalized (e.g., tailored) to each specific user. A training phase is performed to generate a bandwidth extension model that is personalized to a user. The model may be subsequently used in a bandwidth extension phase during a phone call involving the user. The bandwidth extension phase, using the personalized bandwidth extension model, will be activated when a higher band (e.g., wideband) is not available and the call is taking place on a lower band (e.g., narrowband).

32 Claims, 10 Drawing Sheets

PERSONALIZED BANDWIDTH EXTENSION

BACKGROUND

Bandwidth extension of signals is well known and may be defined as the process of expanding the frequency range (bandwidth) of a signal in which it contains useful content or effects. In recent years, bandwidth extension has been used in the high frequency enhancement of coded speech and audio, such as speech in telephone systems. Thus, for example, the quality of narrowband telephone speech can be improved by bandwidth extension.

One type of known bandwidth extension is referred to as blind bandwidth extension. Blind bandwidth extension techniques are used to recreate high frequency bands of a narrowband audio signal. These methods increase the perceived quality of signals that are transmitted via a narrow frequency band as in telephone or radio communication systems.

However, existing blind bandwidth extension techniques use generalized models for performing bandwidth extension. Such generalized models are typically used in bandwidth extension for arbitrary speakers, which may lead to inaccuracies or poor user experience.

SUMMARY

The present systems and methods are directed to personalized (i.e., speaker-derivable) bandwidth extension in which the model used for bandwidth extension is personalized (e.g., tailored) to each specific user.

In an implementation, a training phase is performed to generate a bandwidth extension model that is personalized to a user. The model may be subsequently used in a bandwidth extension phase during a phone call involving the user. The bandwidth extension phase, using the personalized bandwidth extension model, will be activated when a higher band (e.g., wideband) is not available and the call is taking place on a lower band (e.g., narrowband).

In an implementation, the model is trained (personalized to a user, such that it is based on speaker-derivable information) at the far-end station (e.g., mobile phone) during a wideband call in which the user can be identified (e.g., by caller ID).

In another implementation, the model is trained at the near-end station (e.g., at the user's mobile phone) during a call (note that near-end can capture wideband speech regardless of the network condition).

In another implementation, the model is trained off-line at a mobile station (not during a phone call), either with the user's voice or with a target voice selected by the owner of the mobile station. The off-line training involves recording the user's voice or the target voice when the phone is not being used for a phone call.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

The following detailed description, which references and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1:
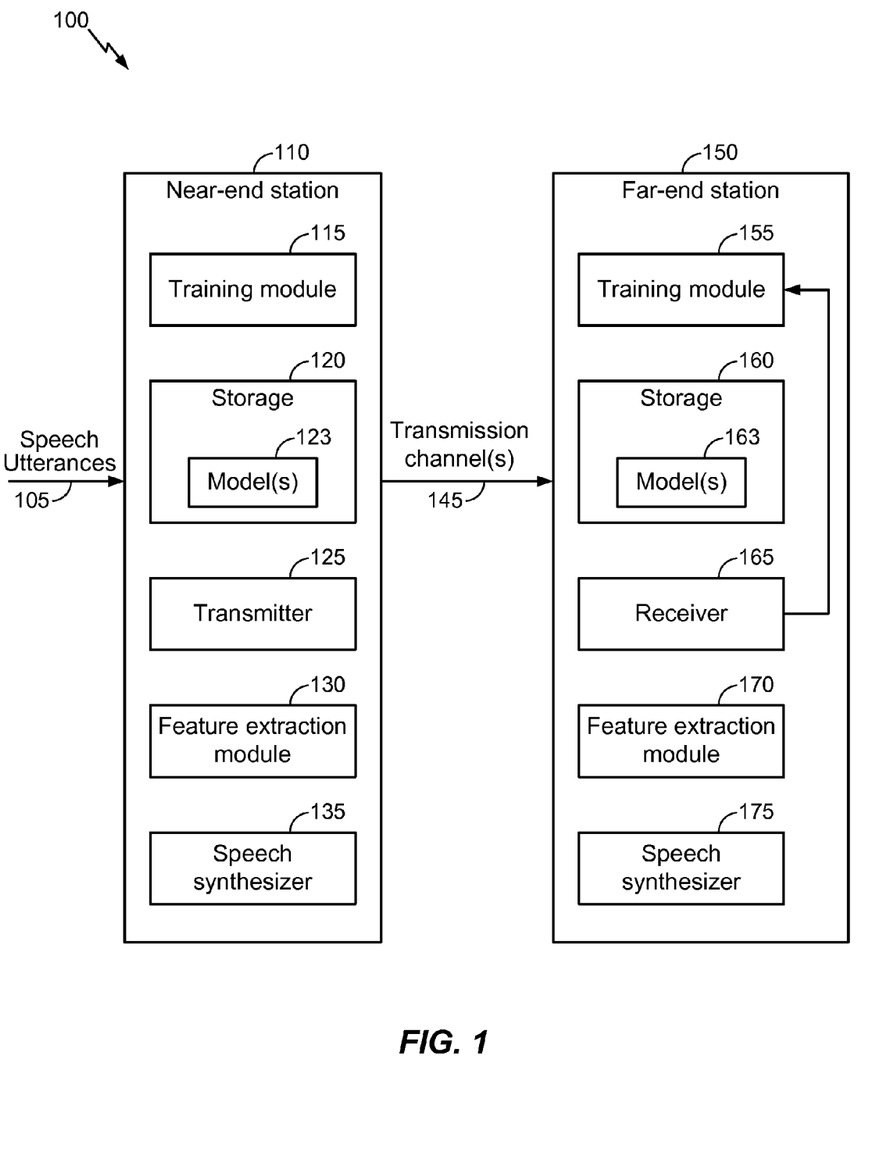
FIG. 1 is a block diagram of an exemplary system in which personalized bandwidth extension may be generated and used.

FIG. 1 is a block diagram of an exemplary system 100 in which personalized bandwidth extension may be generated (based on speaker-derivable information) and used to develop wideband (WB) speech signals from received narrowband (NB) speech signals. The system 100 may be used to generate analog signals that have a larger frequency range than the frequency range of the corresponding received analog signals. As such, whether a signal is a wideband signal or a narrowband signal is dependent on its relation to the other. Although examples and implementations described herein refer to developing WB speech signals from NB speech signals, the present systems and methods are not limited thereto, as the systems and methods disclosed herein can be used for developing any set of speech signals from any other set of speech signals, such as going from super wideband (SWB) to WB or SWB to NB, for example.

As shown, the system 100 includes a near-end station 110 that may be used by a transmitting party, and a far-end station 150 that may be used by a receiving party. The near-end station 110 and the far-end station 150 may each be a device for communicating, such as a mobile station or a computing device. An example mobile station 800 is described with respect to FIG. 11, and an example computing device 900 is described with respect to FIG. 12.

The near-end station 110 and the far-end station 150 may communicate over one or more transmission channels 145.

The communication may comprise transmission, from the near-end station 110 to the far-end station 150, of a narrowband speech signal corresponding to a narrowband version of speech utterances 105 (voice data) of a speaker. The far-end station 150 may use a model 163 trained to the speaker (i.e., based on speaker-derivable information) to generate and output corresponding wideband versions of the speech utterances 105 of the speaker. As described further herein, the model 123, 163 may be trained, generated, and stored either at the near-end station 110 or the far-end station 150, depending on the implementation.

Thus, the speech utterances 105 and the trained model 123, 163 or data (depending on the implementation) may be transmitted over one or more transmission channels 145. More particularly, the transmitter 125 converts the speech utterances 105 (voice data) of a speaker to a narrowband version of the original speech utterances 105 for transmission in accordance with, for example, one or more telecommunications transmission standards. The transmissions of the narrowband version of the original speech utterances and the trained model or data may occur in a generally concurrent manner or, for example, may occur at separate times during the transmission process. Transmission channels suitable for use in this example as well as in the examples set forth below include telephone network channels, wireless cellular network channels, wireless walkie-talkie systems, wired networks, or the like. The narrowband speech signals used in such transmission systems may be limited to a bandwidth of 300 Hz-3.4 kHz, which corresponds to the bandwidth used to transmit speech signals using a Global System for Mobile Communications (GSM) network.

Depending on the implementation, the near-end station 110 may comprise a training module 115, storage 120 (e.g., memory) that may store one or more trained models 123, a transmitter 125, a feature extraction module 130, and a speech synthesizer 135. Similarly though not identically, depending on the implementation, the far-end station 150 may comprise a training module 155, storage 160 (e.g., memory) that may store one or more trained models 163, a receiver 165, a feature extraction module 170, and a speech synthesizer 175.

In some implementations, the speech synthesizer 135 at the near-end station 110 may not be needed or used. For example, in an implementation that uses a feature domain comparison mechanism only from the WB input in the near-end station 110, real speech may not be generated and thus the speech synthesizer 135 may not be needed or used. In such a case (which uses a feature domain similarity comparison to compute the similarity between each existing entry and the input), a model and feature (such as a NB feature) is sent to the far-end station 150 such that WB speech can be synthesized at the far-end station 150. However, in an implementation that uses an "analysis-by-synthesis" mechanism to learn the model by comparing the actual WB input and the synthesized WB input, the speech synthesizer 135 may be used. This type of implementation uses a synthesized speech signal domain similarity comparison to compute the similarity between each existing entry and the input.

Speech utterances 105 are received at the near-end station 110 from a user of the near-end station 110. The speech utterances 105 are used to provide personalized bandwidth extension in which a model used for bandwidth extension is personalized (e.g., tailored) to each specific user.

In an implementation, a training phase is performed to generate a bandwidth extension model (also referred to herein as "model") that is personalized to a user. The training phase may be performed at the near-end station 110 using the training module 115, or at the far-end station 150 using the training module 155. The personalized bandwidth extension model 123 generated by the training module 115 may be stored in storage 120, and the model 163 generated by the training module 155 may be stored in storage 160. The storages 120, 160 may store more than one model (e.g., personalized to different users) and may take the form of a database for example.

Depending on the implementation, the near-end station 110 and/or the far-end station 150 may comprise a feature extraction module (e.g., feature extraction modules 130, 170, respectively). The feature extraction module extracts wideband features from the user's speech, and these wideband features are used in generating the training model.

The trained model 123, 163 can be stored in the user's phone (e.g., the near-end station 110), or sent to other users' phones (e.g., the far-end station 150). The model 123, 163, based on the wideband training data, may then be used during a narrowband call involving the user. The model is made available at the reproduction side of the phone call (i.e., at the far-end station 150).

Thus, the model, such as the model 123 or the model 163, may be subsequently used in a bandwidth extension phase during a phone call involving the user associated with the model. The phone call may take place between the near-end station 110 and the far-end station 150 via one or more transmission channels 145. In particular, the transmitter 125 of the near-end station 110 may transmit speech that it has received to the receiver 165 of the far-end station via the transmission channel(s) 145. The bandwidth extension phase, using the personalized bandwidth extension model, will be activated when a higher band (e.g., wideband) is not available and the call is taking place on a lower band (e.g., narrowband). During a narrowband call, the receiver 165 uses narrowband speech signals from the speaker along with the trained model 123, 163 (previously generated and stored) to generate a wideband speech signal corresponding to a wideband version of the speech utterances 105 of the speaker.

The feature extraction module 130, 170 may also extract narrowband features from a phone call during the phone call, and provide these narrowband features to a speech synthesizer 135, 175. Depending on the implementation, the near-end station 110 and/or the far-end station 150 may comprise a speech synthesizer (e.g., speech synthesizers 135, 175). The speech synthesizer 135, 175 performs wideband speech synthesis using the personalized bandwidth extension training model combined with the extracted narrowband features. The wideband speech may then be outputted.

Figure 2:
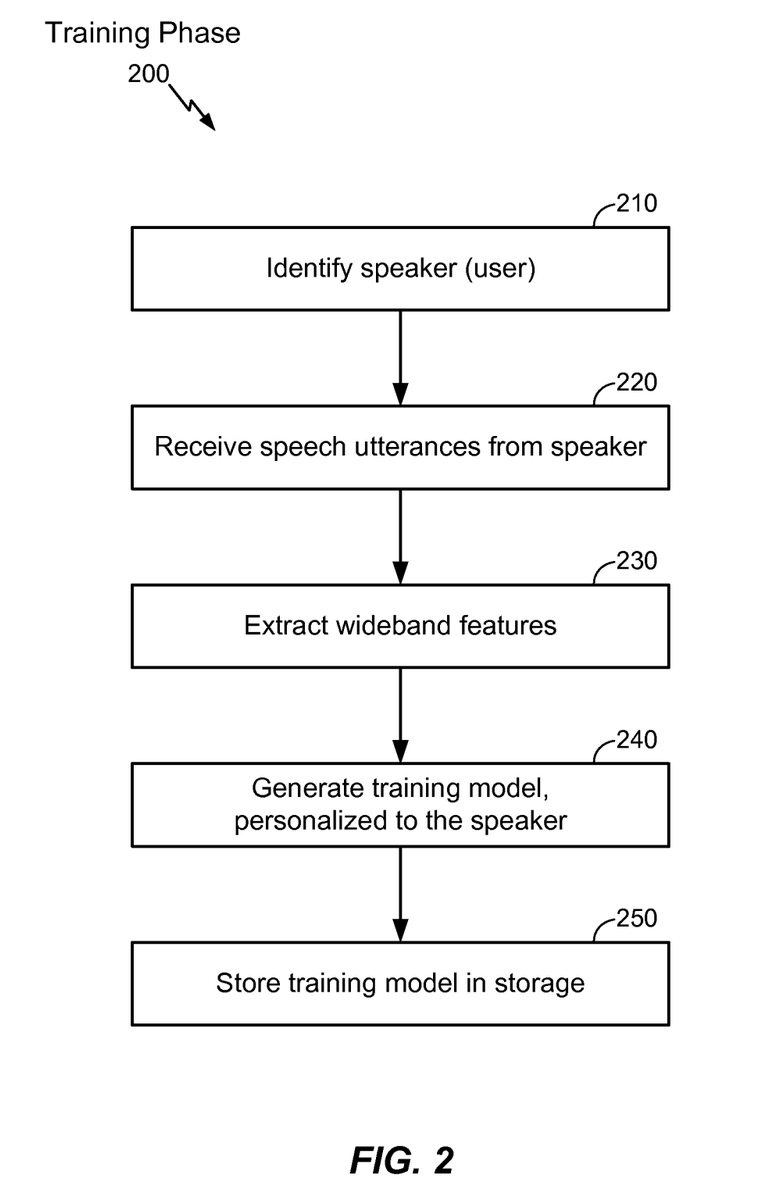
FIG. 2 is an operational flow of an implementation of a method of training for personalized bandwidth extension.

FIG. 2 is an operational flow of an implementation of a method 200 of training for personalized bandwidth extension. The training phase is used to generate a model that may subsequently be used in a narrowband call. Depending on the implementation, as described further herein, the training phase is performed at the far-end station with an incoming wideband call, at the near-end station during a wideband call, or off-line. At 210, the speaker (also referred to herein as the user) is identified, for example by the user entering or inputting their name or other identifier into the station, or by caller ID for example.

At 220, the speaker speaks utterances (also referred to as speech utterances) which are captured or otherwise received by the station. At 230, wideband features are extracted from the utterances (e.g., from the voice data corresponding to the utterances). Feature training is performed (until enough data has been collected for proper training) to generate a training model at 240. Data may be collected until one or more predetermined conditions are met, such as until the data is diverse enough (meets a diversity threshold or criteria) and/or the data has been collected for a long enough time (e.g., minutes, hours, days, depending on the implementation). At this point, the training model may be stored, at 250, and may be used in a narrowband call.

It is contemplated that if enough data is not collected to generate a training model for personalized bandwidth extension, then a bandwidth extension model that has been trained for the general population (i.e., a "generalized model") may be adapted with the personalized data that has been collected thus far. For example, in an implementation where a table (such as a table described below with respect to FIGS. 7-10) contains the data for a generalized model, and that table is to be modified into a table containing personalized data for use as (or with) a personalized training model, that table may be adapted using the personalized data that has been thus far received. This allows for a smoother transition to when the complete set of personalized data has been collected (e.g., when one or more predetermined conditions described above are met) and incorporated into the table (i.e., when the table is modified using the complete set of personalized data that has been collected). In another implementation, if enough data is not collected to generate a training model for personalized bandwidth extension, then a generalized model may be used until enough personalized data has been collected.

Figure 3:
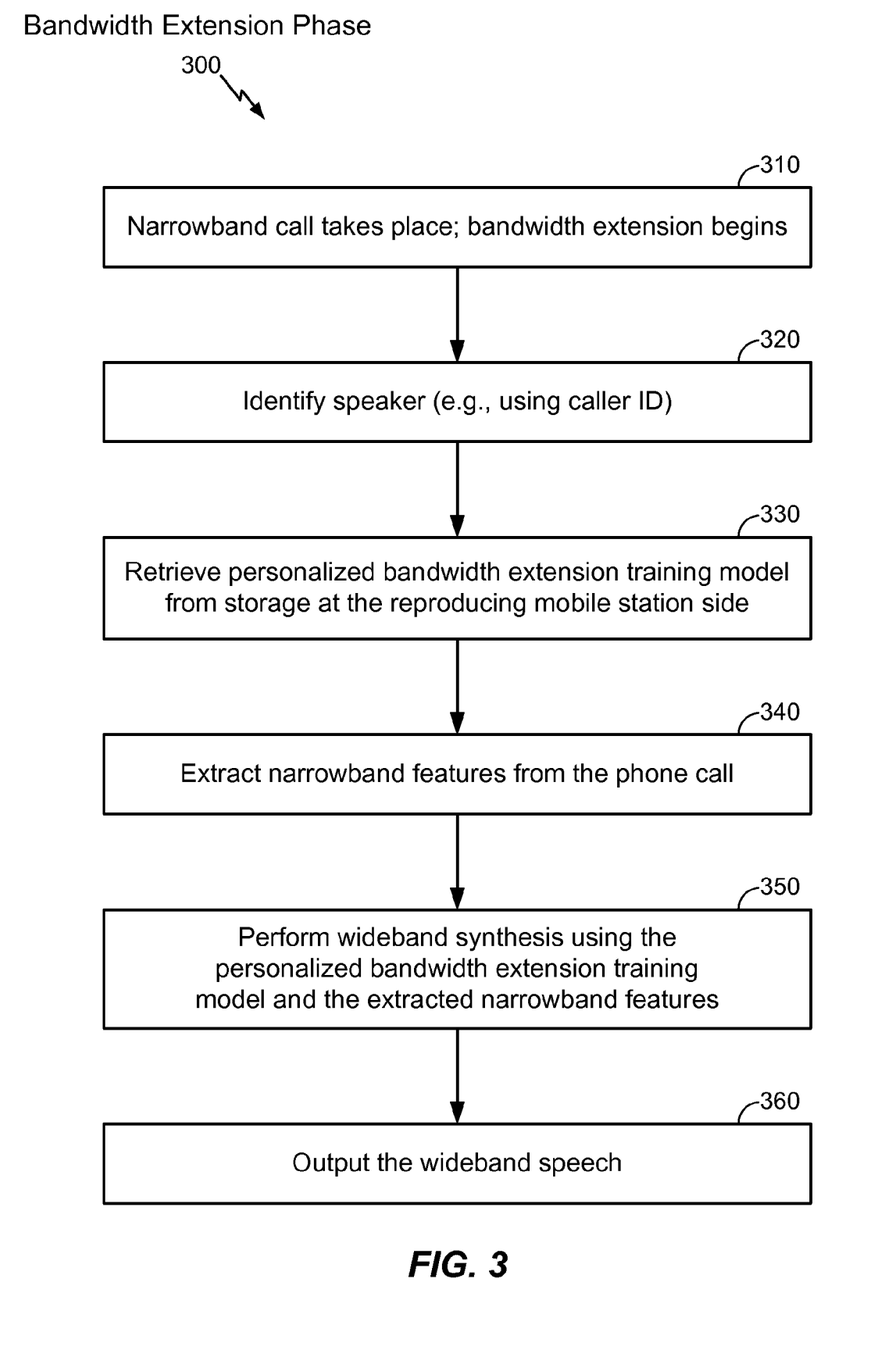
FIG. 3 is an operational flow of an implementation of a method of performing personalized bandwidth extension.

FIG. 3 is an operational flow of an implementation of a method 300 of performing personalized bandwidth extension. At 310, a narrowband call takes place between the near-end station and the far-end station, and the bandwidth extension phase begins. The speaker is identified at 320 (e.g., using caller ID), and the appropriate bandwidth extension training model (associated with that speaker) is retrieved from storage (e.g., at the reproducing station side, such as at the far-end station) or received from the transmitting station side (e.g., the narrowband speech source, such as the near-end station) at 330. Some manner of speaker identification may be employed to make sure that the person currently speaking is the same individual who has spoken during the generation of the model. If the speaker cannot be identified, then personalized bandwidth extension may be rejected or terminated.

At 340, narrowband features from the speech utterances (e.g., from the voice data) in the phone call are extracted and mapped to the speaker's personalized wideband features using the model. Wideband speech synthesis is performed at 350 using the personalized bandwidth extension training model combined with the extracted narrowband features. The wideband speech is output at 360.

Figure 4:
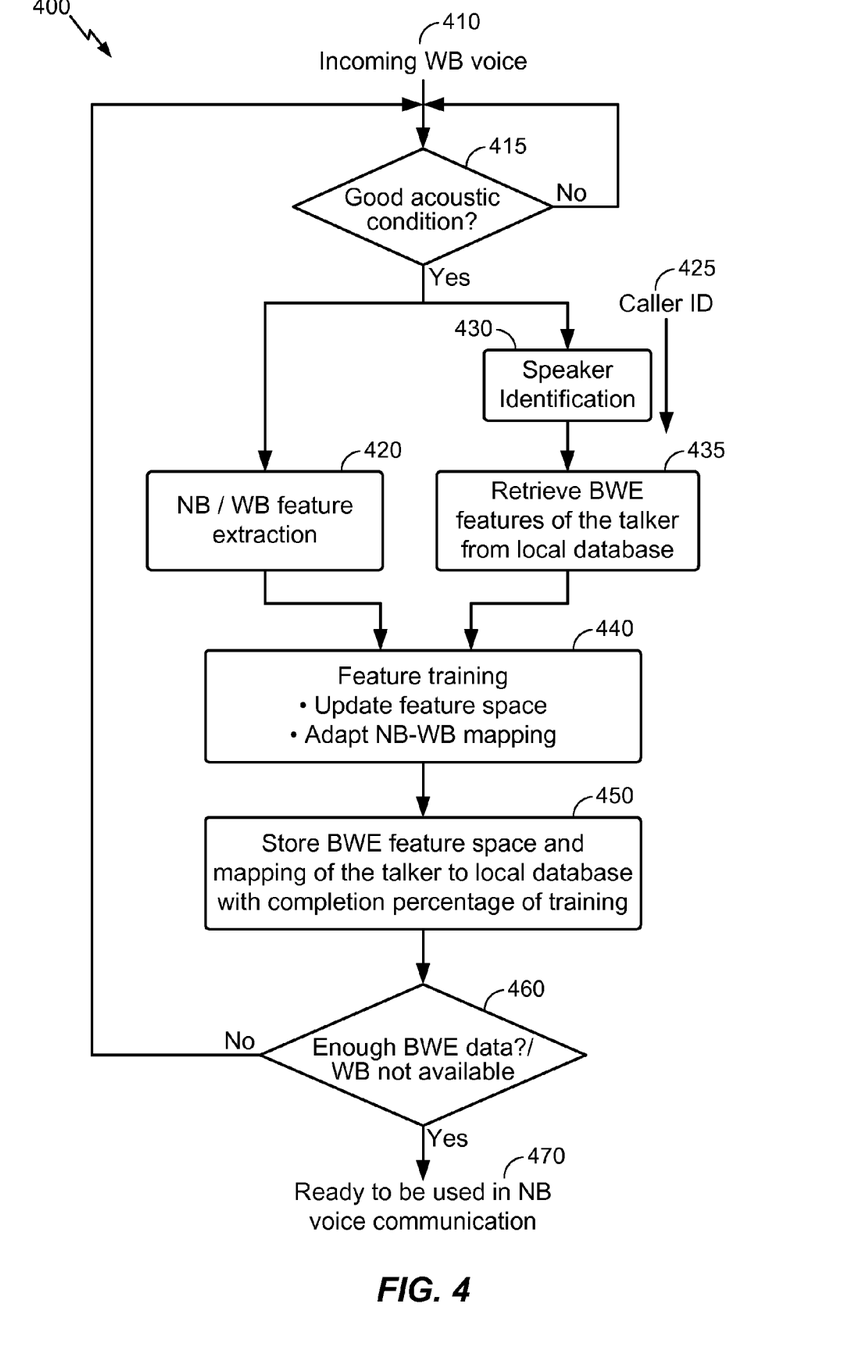
FIG. 4 is an operational flow of another implementation of a method of training for personalized bandwidth extension.

FIG. 4 is an operational flow of another implementation of a method of training for personalized bandwidth extension. In this implementation, the model is trained (personalized to a user) at the far-end station 150 during a wideband call in which the user can be identified (e.g., by caller ID).

At 410, the speaker's voice (e.g., speech utterances) is received at the far-end station during a wideband call from the near-end station. At 415, it is determined if the acoustic condition of the speaker's voice or speech utterances is of high enough quality to be used for training. The quality may be based on signal-to-noise ratio (SNR) for example, or other noise-based statistics and/or measurements. Thus, for example, if the SNR is above a predetermined threshold, then the quality of the utterances is high enough to be used in the generation of a personalized bandwidth extension training model. If not, processing returns to 410 and continues until the acoustic condition is acceptable.

If the acoustic condition is determined to be acceptable at 415, then narrowband and wideband features are extracted from the speech utterances at 420, and the speaker is identified at 430, either by the speaker, a user of the far-end station, or caller ID 425, for example. Bandwidth extension (BWE) features pertaining to the speaker may be retrieved from storage (such as a local database) at 435, if any bandwidth extension features had been previously generated and stored, as this is an iterative process.

At 440, feature training is performed using the extracted features from 420 and the retrieved bandwidth extension features from 435. This feature training may include updating the feature space and adapting the narrowband-wideband mapping for the speaker. Any technique for determining a similarity measure and matching may be used, such as the feature domain similarity comparison described above, the synthesized speech signal domain similarity comparison described above, as well as any distance metric, including but not limited to least square fit with allowable time adjustment (in the time domain or the frequency domain), a feature based approach (such as using LPC/LPCC, MFCC, or audio fingerprints), or a higher order based approach (such as cross-cumulant, empirical Kullback-Leibler Divergence, or Itakura-Saito distance).

In an implementation, updating may be performed from an initialized feature space (e.g., a universal codebook for the general population) toward the personalized feature space (e.g., personalized codebook for the speaker). A codebook entry may be replaced with a weighted sum between the current feature vector and the nearest existing codebook entry. If too much memory consumption becomes an issue, priority of memory consumption can be given to certain speakers by easing the update condition from the universal feature space, in an implementation. Alternatively or additionally, only a different feature space or only the delta or change from the universal feature space may be stored. The generalized feature space can be pre-stored at the station or sent or otherwise provided to the station for subsequent use.

It is contemplated that even with no updating of the feature space, personalized bandwidth extension may still be obtained using the personalized narrowband-wideband mapping model.

At 450, the bandwidth extension feature space and mapping for the speaker may be stored (e.g., in the local database) with a completion percentage of training (e.g., relative to a predetermined threshold of amount of features and/or mapping that is to occur before completion of the training model). In an implementation, the model training completion percentage can be obtained by, or based on, measuring time used for training with proper VAD (voice activity detection) to exclude non-speech part, and measuring the count of how many new narrowband-wideband mappings are constructed.

In an implementation, an indicator can be provided in an address book, accessible to a user, to indicate that wideband is available with some percentage of training completion. The address book may comprise a database, for example, that stores and lists various users and an indicator to indicate whether wideband is available for each user and/or a percentage of training completion. The user can decide whether to use bandwidth extension to wideband based on the user interface with the training completion percentage. Alternatively or additionally, a default may be set such that whenever the training completion percentage reaches a certain level (e.g., 99%), then bandwidth extension to wideband is automatically switched to, when wideband is not available, or, for example when some coding resource is to be saved or preserved (e.g., bad network condition or heavy data transfer during the call.)

At 460, it is determined if there is enough bandwidth extension data stored (e.g., relative to a predetermined threshold) to be used in a call when a wideband connection is not available.

If not, processing continues at 410 to gather more utterances and generate more bandwidth extension data. However, if enough bandwidth extension data has been generated and stored, then the processing stops and the resulting model is ready to be used in narrowband voice communication, at 470.

Depending on the implementation, personalized bandwidth extension may be used in any of several cases, such as, for example, (1) when wideband is not available throughout the call; (2) when wideband is available for a portion of the call, but is not available for another portion of the call, and the personalized bandwidth extension becomes activated when wideband is not available; and (3) when wideband is available always or available for some portion of the call, and the personalized bandwidth extension becomes activated even when wideband is available if the personalized bandwidth extension model becomes good enough and the carrier company decides to switch to the personalized bandwidth extension mode.

Figure 5:
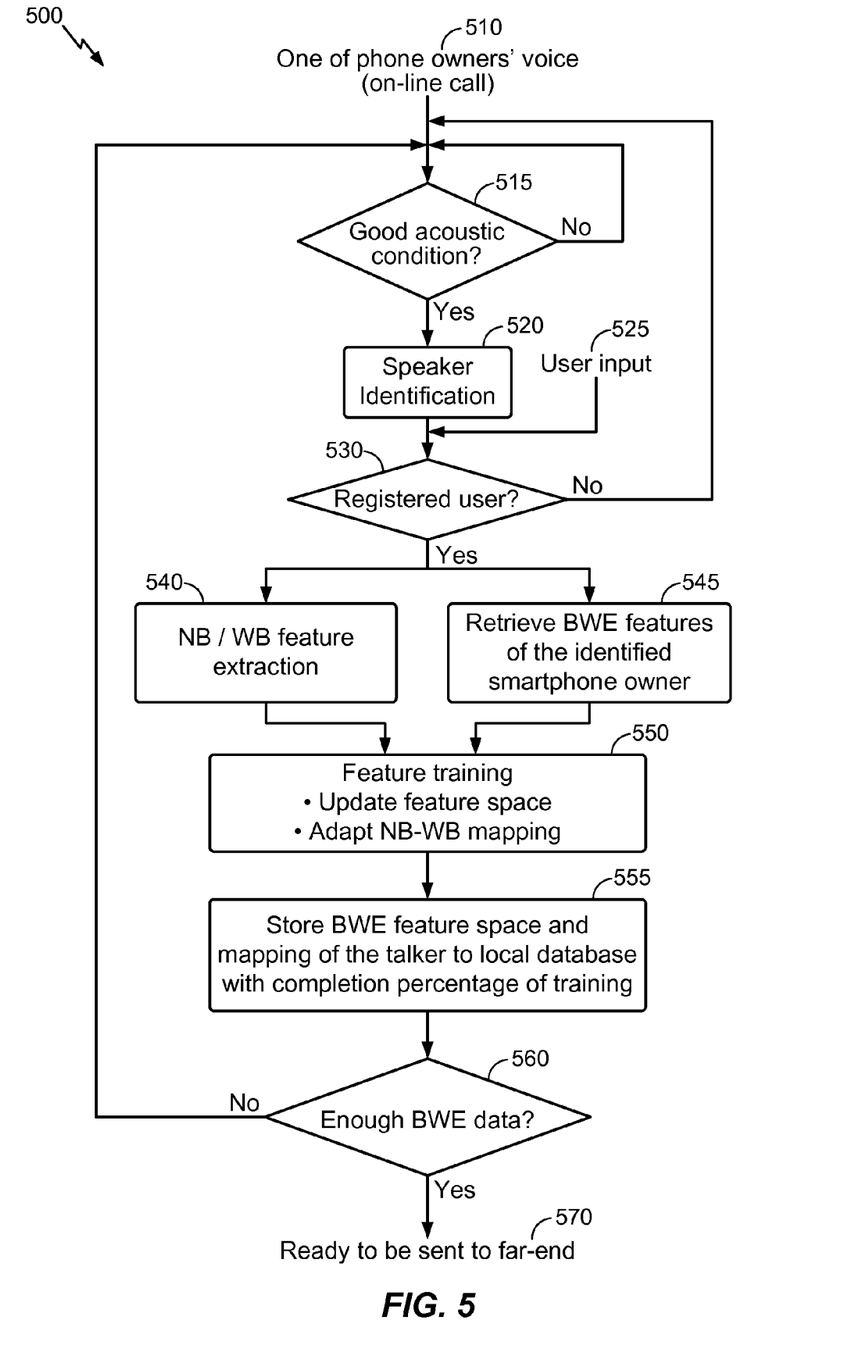
FIG. 5 is an operational flow of another implementation of a method of training for personalized bandwidth extension.

FIG. 5 is an operational flow of another implementation of a method 500 of training for personalized bandwidth extension. In this implementation, the model is trained at the near-end station 110 (e.g., at the user's mobile phone) during a call. It is noted that the near-end station 110 can capture wideband speech regardless of the network condition.

At 510, a phone call takes place (i.e., an on-line call) in which the speaker is on the call and speaking (providing speech utterances) to the speaker's station. At 515, it is determined if the acoustic condition of the speaker's voice or speech utterances is of high enough quality to be used for training. As noted above, an SNR technique may be used to determine whether the acoustic condition is acceptable or not. If not, processing returns to 510 and continues until the acoustic condition is acceptable.

If the acoustic condition is determined to be acceptable at 515, then the speaker is identified at 520, by the speaker via user input 525, for example. At 530, it is determined if the identified speaker is a registered user (e.g., by comparing the identification of the speaker to a list of registered users in storage associated with the speaker's station). Determining if the identified speaker is a registered user is used to prevent unwanted training for other persons than the registered users as owners of the station (e.g., owners of the mobile phone). If the speaker is not a registered user, processing returns to 510. However, if it is determined that the identified speaker is a registered user, then narrowband and wideband features are extracted from the speech utterances at 540, and bandwidth extension features pertaining to the speaker may be retrieved from storage (such as a local database) at 545, if any bandwidth extension features had been previously generated and stored, as this is an iterative process.

At 550, feature training is performed using the extracted features from 540 and the retrieved bandwidth extension features from 545. This feature training may include updating the feature space and adapting the narrowband-wideband mapping for the speaker, similar to that described above with respect to the method 400. At 555, the bandwidth extension feature space and mapping for the speaker may be stored (e.g., in the local database) with a completion percentage of training (e.g., relative to a predetermined threshold of amount of features and/or mapping that is to occur before completion of the training model).

At 560, it is determined if there is enough bandwidth extension data stored (e.g., relative to a predetermined threshold) to be used in a call when a wideband connection is not available. If not, processing continues at 510 to gather more utterances and generate more bandwidth extension data. However, if enough bandwidth extension data has been generated and stored, then the processing stops and the resulting model is ready to be used in narrowband voice communication.

The model may be sent to a far-end station at 570, for use in a narrowband voice communication. Such data transmission can be made in background, whenever user-to-user data-connection becomes available and there exists a delta from the previous data. Alternatively, like in mail or short message push, the available user's model can be notified to the user who has the contact in its phone address book, whenever the model's owner wants to update her/his model. Alternatively, in the beginning of the call, if the trained model is available and is either new or modified since the last sync-up, it can be transmitted.

Figure 6:
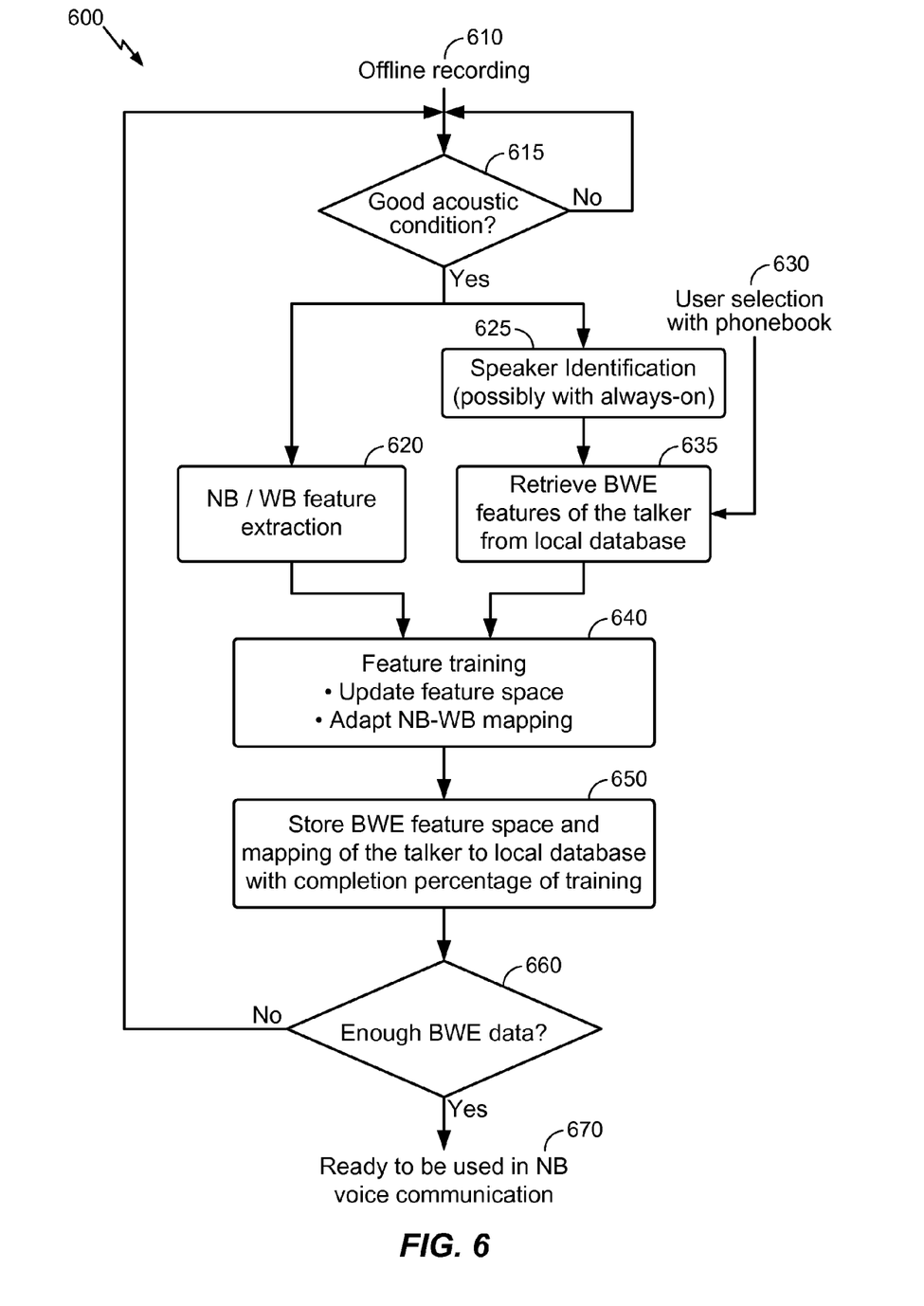
FIG. 6 is an operational flow of another implementation of a method of training for personalized bandwidth extension.

FIG. 6 is an operational flow of another implementation of a method 600 of training for personalized bandwidth extension. In this implementation, the model is trained off-line (e.g., not during a phone call) at a mobile station (e.g., at either the near-end station 110 or the far-end station 150 or any mobile station having the appropriate capability), either with the user's voice or with a target voice selected by the owner of the mobile station. The off-line training involves recording the user's voice or the target voice when the phone is not being used for a phone call.

At 610, while the station is off-line (i.e., a phone call is not taking place), a speaker speaks to the station to provide speech utterances to the speaker's station. At 615, it is determined if the acoustic condition of the speaker's voice or speech utterances is of high enough quality to be used for training. If not, processing returns to 610 and continues until the acoustic condition is acceptable.

If the acoustic condition is determined to be acceptable at 615, then the speaker is identified at 625, by the speaker via user input 630 (e.g., user selection of identification from a predetermined phonebook associated with the station).

Narrowband and wideband features are extracted from the speech utterances at 620, and bandwidth extension features pertaining to the identified speaker may be retrieved from storage (such as a local database) at 635, if any bandwidth extension features had been previously generated and stored, as this is an iterative process.

At 640, feature training is performed using the extracted features from 620 and the retrieved bandwidth extension features from 635. This feature training may include updating the feature space and adapting the narrowband-wideband mapping for the speaker. At 650, similar to that described above with respect to the method 400, the bandwidth extension feature space and mapping for the speaker may be stored (e.g., in the local database) with a completion percentage of training (e.g., relative to a predetermined threshold of amount of features and/or mapping that is to occur before completion of the training model).

At 660, it is determined if there is enough bandwidth extension data stored (e.g., relative to a predetermined threshold) to be used in a call when a wideband connection is not available. If not, processing continues at 610 to gather more utterances and generate more bandwidth extension data. However, if enough bandwidth extension data has been generated and stored, then the processing stops and the resulting model is ready to be used in narrowband voice communication at 670.

Figure 7:
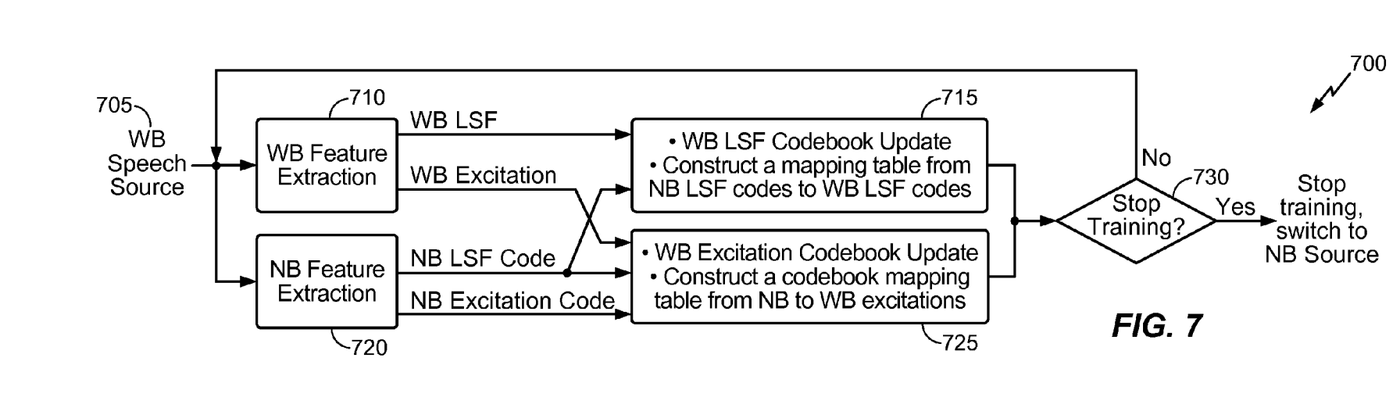
FIG. 7 is an operational flow of an implementation of a method of performing training for spectral envelope/excitation-based personalized bandwidth extension.
Figure 8:
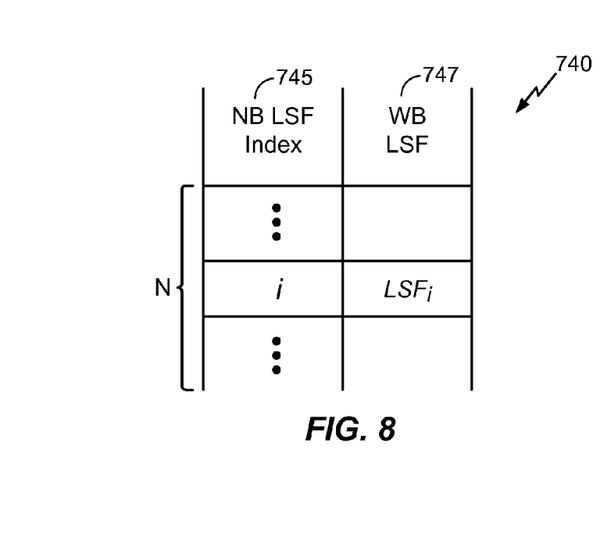
FIG. 8 is a diagram of an example mapping table that may be used with spectral envelope/excitation-based personalized bandwidth extension.

FIG. 7 is an operational flow of an implementation of a method 700 of performing training for spectral envelope/excitation-based personalized bandwidth extension when wideband source is available. At 705, speech from a speech source (e.g., speech utterances) is generated and provided to a station. Wideband (WB) feature extraction is performed at 710 and narrowband (NB) feature extraction is performed at 720. The WB line spectral frequency (LSF) and the NB LSF are provided at 715 to a WB LSF codebook update, and to construct a mapping table that maps from NB LSF codes to WB LSF codes. An example mapping table 740, such as one generated at 715, is shown in FIG. 8. The NB LSF index 745 is provided, along with a corresponding WB LSF 747, in FIG. 8. The WB codebook is initialized with generalized LSFs (e.g., pertaining to a general population of people). For NB LSF code i, update the associated WB LSF codebook entry based on the WB LSF of the current frame.

Figure 9:
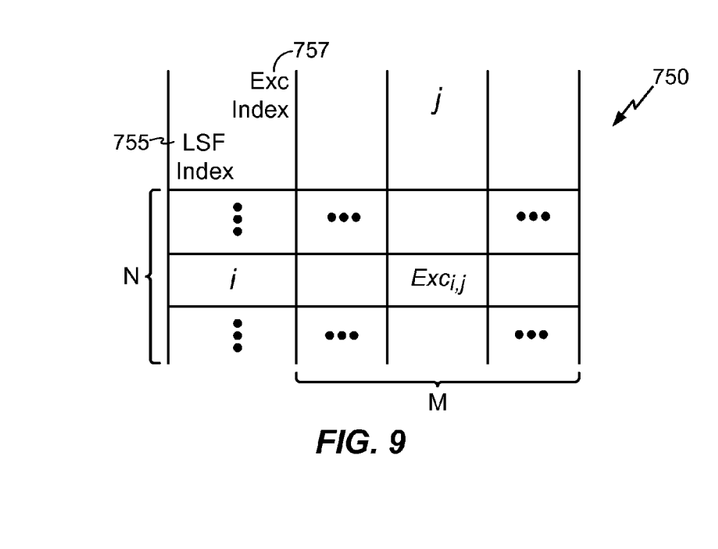
FIG. 9 is a diagram of another example mapping table that may be used with spectral envelope/excitation-based personalized bandwidth extension.

Returning to FIG. 7, the WB excitation, along with the NB LSF and NB excitation, are provided at 725 to a WB excitation codebook update, and to construct a codebook mapping table from NB to WB excitations. It is determined at 730 whether to stop training or not (e.g., based on whether enough training data has been obtained). If so, then training is stopped at 735; otherwise, processing continues at 705 with additional speech utterances being used in the training. An example mapping table 750, such as one generated at 725, is shown in FIG. 9. The LSF index 755 is provided, along with a corresponding excitation index 757. The codebook is initialized with generalized excitations (i.e., excitations derived from a general population). For NB LSF code i and NB excitation code j, update the associated WB excitation codebook entry.

Figure 10:
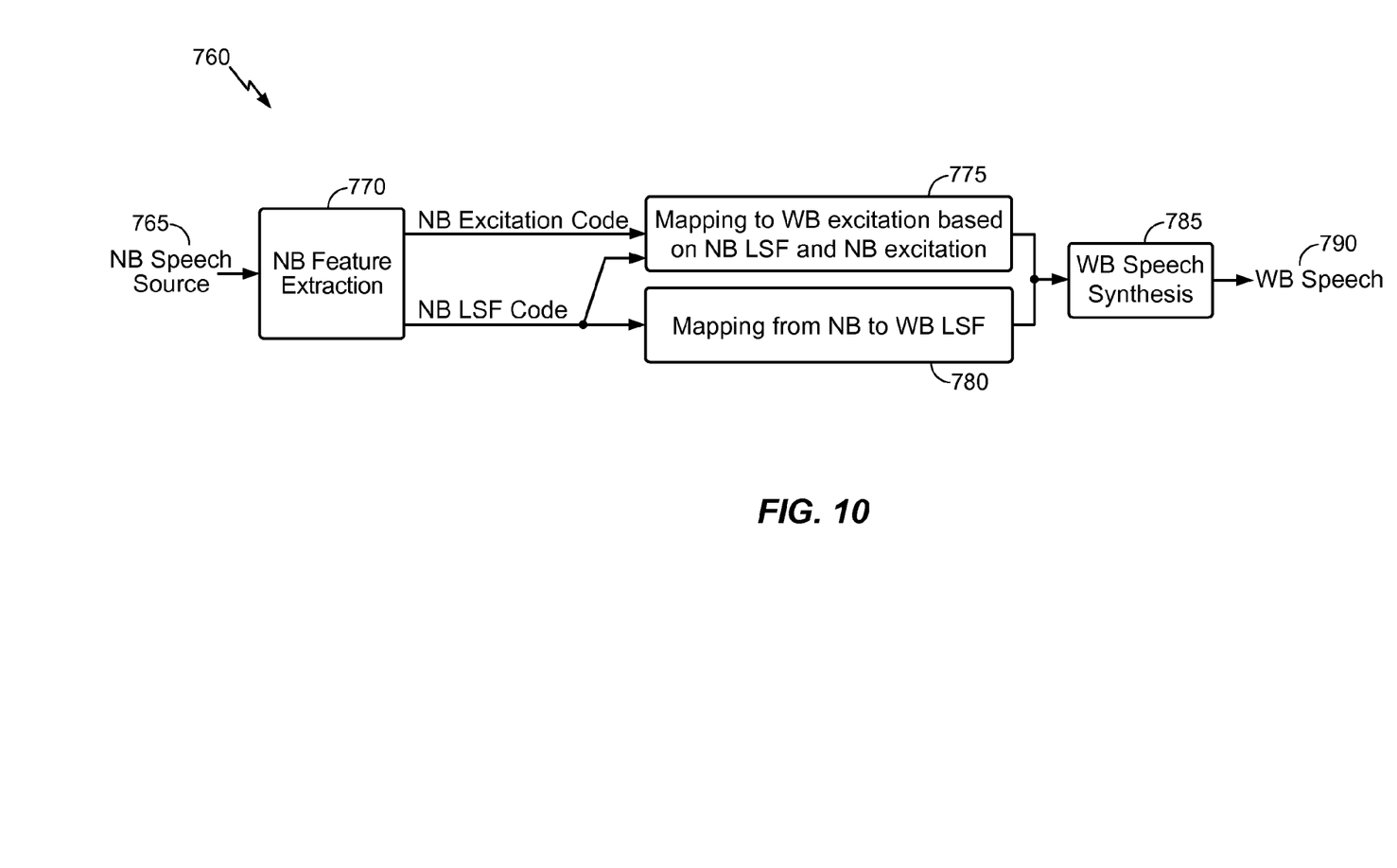
FIG. 10 is an operational flow of an implementation of a method of performing spectral envelope/excitation-based personalized bandwidth extension.

FIG. 10 is an operational flow of an implementation of a method 760 of performing spectral envelope/excitation-based personalized bandwidth extension when only a narrowband source is available. At 765, narrowband speech is provided to a station, such as the far-end station 150. At 770, narrowband features are extracted, resulting in NB excitation codes and NB LSF codes.

At 775, a mapping is performed to WB excitations using the NB excitation codes and the NB LSF codes. A mapping is also performed from the NB LSF to the WB LSF, at 780. Using the mappings, WB speech is synthesized at 785, and outputted at 790.

It is noted that there might be a non-unique mapping problem between NB and WB. To resolve this issue, a technique may be used that is similar to the language model for speech recognition called N-gram. In an implementation, look at the past (or possible future if delay is permitted) frames to construct the mapping. For example, if a 2-gram is constructed, then the mapping becomes NB_{i−1},NB{i}-WB{i} instead of NB_{i}-WB{i}.

In an implementation of the training phase for a spectral envelope (e.g., LPC (linear prediction coefficients), LSF, Mel-frequency cepstrum coefficients (MFCC), etc.), when the wideband signal is available, find the spectral envelope (SE) codebook entry for the narrowband speech and the SE of the corresponding wideband signal to construct a codebook mapping or HMM/GMM (Hidden Markov model/Gaussian mixture model) for example. Any method to keep the lower band SEs and/or prevent too close SEs may also be applied.

In an implementation, for the codebook mapping, the WB SE table is initialized with the table for the BWE for the generalized population. Each entry in the table is replaced/adapted when the corresponding NB SE is observed. The number of updated entries and/or the number of updates per entry may be maintained and analyzed to determine if enough training data has been obtained.

In an implementation of the personalized bandwidth extension phase for a spectral envelope, given a NB SE, determine the corresponding WB SE by codebook mapping (table lookup or filtering) or from the probabilistic model (GMM/HMM).

Regarding a training phase for an excitation implementation, given an NB-excitation codebook (FCB (fixed codebook) or FCB/ACB (adaptive codebook)) and NB SE, the present systems and methods may construct a mapping/probabilistic model from the NB SE and excitation to WB excitation. For example, one might construct a WB excitation table with N*M entries where N is the number of entries in the NB excitation codebook and M is the number of entries in the NB SE codebook. This table is initialized with the entries for bandwidth extension for a generalized population. Each entry in the table is replaced/adapted when the corresponding NB SE/excitation combination is observed. The number of updated entries and/or the number of updates per entry may be maintained and analyzed to determine if enough training data has been obtained.

For the bandwidth extension phase, a reliability measure (criterion) may be used to determine whether to use personalized bandwidth extension and may be based on the number of updated entries in the table and/or the training data length in time. If above a predetermined amount or threshold, for example, then personalized bandwidth extension may be used.

Moreover, in some implementations, multiple levels of a reliability measure can be used. For example, (1) if the reliability measure is very high, the personalized bandwidth extension may be used even when the network resource is enough for WB (to reduce network capacity); (2) if the reliability measure is in the medium range, the personalized bandwidth extension may be used when the network cannot support WB; and (3) if the reliability measure is low, then narrowband communication or a generalized bandwidth extension may be used.

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa).

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The term "signal processing" (and grammatical variants thereof) may refer to the processing and interpretation of signals. Signals of interest may include sound, images, and many others. Processing of such signals may include storage and reconstruction, separation of information from noise, compression, and feature extraction. The term "digital signal processing" may refer to the study of signals in a digital representation and the processing methods of these signals. Digital signal processing is an element of many communications technologies such as mobile stations, non-mobile stations, and the Internet. The algorithms that are utilized for digital signal processing may be performed using specialized computers, which may make use of specialized microprocessors called digital signal processors (sometimes abbreviated as DSPs).

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

Figure 11:
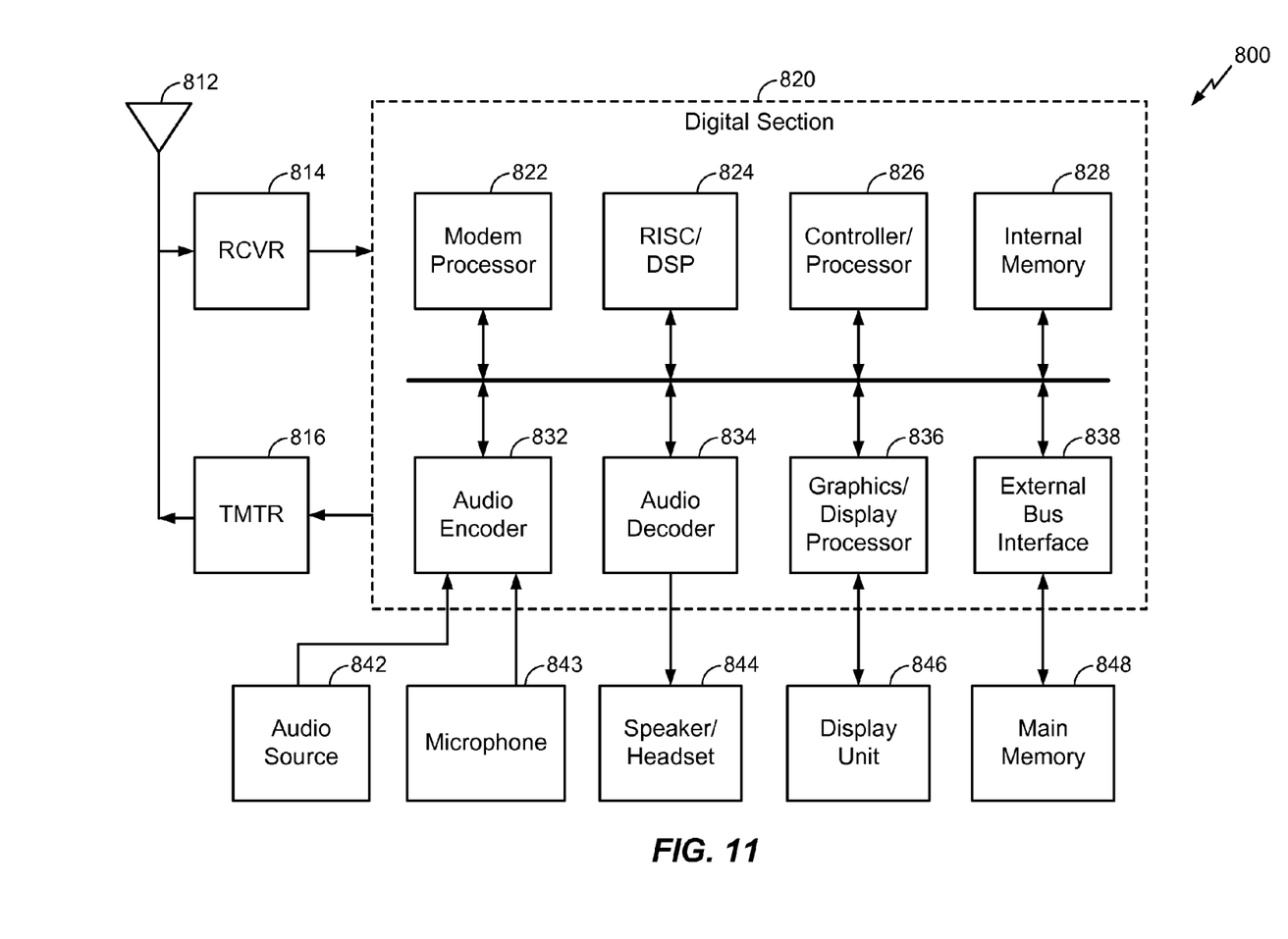
FIG. 11 is a diagram of an example mobile station.

FIG. 11 shows a block diagram of a design of an example mobile station 800 in a wireless communication system. Mobile station 800 may be a smart phone, a cellular phone, a terminal, a handset, a PDA, a wireless modem, a cordless phone, etc. The wireless communication system may be a code division multiple access (CDMA) system, a GSM system, etc.

Mobile station 800 is capable of providing bidirectional communication via a receive path and a transmit path. On the receive path, signals transmitted by base stations are received by an antenna 812 and provided to a receiver (RCVR) 814. Receiver 814 conditions and digitizes the received signal and provides samples to a digital section 820 for further processing. On the transmit path, a transmitter (TMTR) 816 receives data to be transmitted from digital section 820, processes and conditions the data, and generates a modulated signal, which is transmitted via antenna 812 to the base stations. Receiver 814 and transmitter 816 may be part of a transceiver that may support CDMA, GSM, etc.

Digital section 820 includes various processing, interface, and memory units such as, for example, a modem processor 822, a reduced instruction set computer/digital signal processor (RISC/DSP) 824, a controller/processor 826, an internal memory 828, a generalized audio encoder 832, a generalized audio decoder 834, a graphics/display processor 836, and an external bus interface (EBI) 838. Modem processor 822 may perform processing for data transmission and reception, e.g., encoding, modulation, demodulation, and decoding. RISC/DSP 824 may perform general and specialized processing for mobile station 800. Controller/processor 826 may direct the operation of various processing and interface units within digital section 820. Internal memory 828 may store data and/or instructions for various units within digital section 820.

Generalized audio encoder 832 may perform encoding for input signals from an audio source 842, a microphone 843, etc. Generalized audio decoder 834 may perform decoding for coded audio data and may provide output signals to a speaker/headset 844. Graphics/display processor 836 may perform processing for graphics, videos, images, and texts, which may be presented to a display unit 846. EBI 838 may facilitate transfer of data between digital section 820 and a main memory 848.

Digital section 820 may be implemented with one or more processors, DSPs, microprocessors, RISCs, etc. Digital section 820 may also be fabricated on one or more application specific integrated circuits (ASICs) and/or some other type of integrated circuits (ICs).

Figure 12:
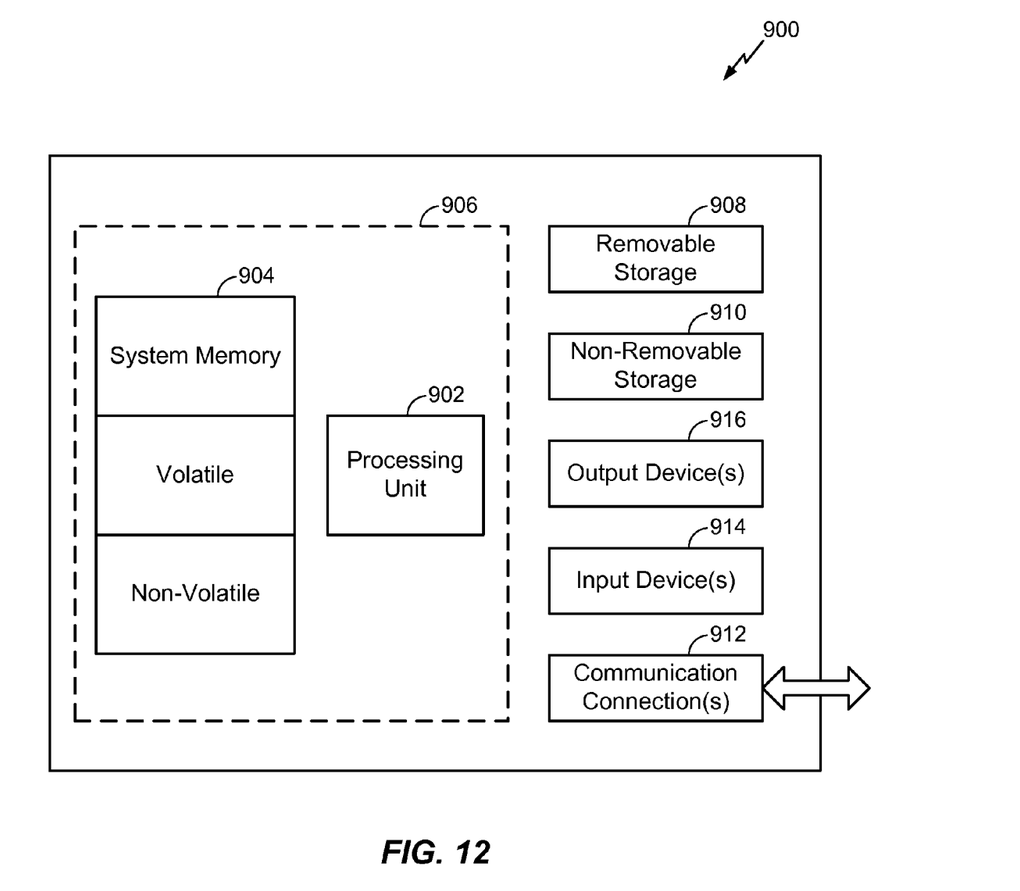
FIG. 12 shows an exemplary computing environment.

FIG. 12 shows an exemplary computing environment in which example implementations and aspects may be implemented. The computing system environment is only one example of a suitable computing environment and is not intended to suggest any limitation as to the scope of use or functionality.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 12 by dashed line 906.

Computing device 900 may have additional features and/or functionality. For example, computing device 900 may include additional storage (removable and/or non-removable) including, but not limited to, magnetic or optical disks or tape. Such additional storage is illustrated in FIG. 12 by removable storage 908 and non-removable storage 910.

Computing device 900 typically includes a variety of computer-readable media. Computer-readable media can be any available media that can be accessed by device 900 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

In general, any device described herein may represent various types of devices, such as a wireless or wired phone, a cellular phone, a laptop computer, a wireless multimedia device, a wireless communication PC card, a PDA, an external or internal modem, a device that communicates through a wireless or wired channel, etc. A device may have various names, such as access terminal (AT), access unit, subscriber unit, mobile station, mobile device, mobile unit, mobile phone, mobile, remote station, remote terminal, remote unit, user device, user equipment, handheld device, non-mobile station, non-mobile device, endpoint, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field-programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions on a computer-readable medium, such as random access RAM, ROM, non-volatile RAM, programmable ROM, EEPROM, flash memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for bandwidth extension of a signal transmitted from a near-end station to a far-end station, comprising:
   receiving, at the far-end station, a wideband signal transmitted from the near-end station;
   generating, at the far-end station, a bandwidth extension model based on the received wideband signal transmitted by the near-end station with data of an identified speaker of the wideband signal; and
   performing bandwidth extension using the bandwidth extension model on a narrowband call including the identified speaker, wherein narrowband features from voice data in the narrowband call are extracted and mapped, using the bandwidth extension model, to personalized wideband features of the identified speaker.

2. The method of claim 1, wherein the bandwidth extension model is personalized with the data of the identified speaker.

3. The method of claim 1, wherein the bandwidth extension model is based on speaker-derivable information.

4. The method of claim 1, wherein generating the bandwidth extension model comprises training the bandwidth extension model with the data of the identified speaker.

5. The method of claim 1, wherein generating the bandwidth extension model comprises identifying the speaker and extracting wideband features from the wideband signal.

6. The method of claim 1, wherein performing bandwidth extension on the narrowband call comprises:
   identifying the speaker; and
   retrieving from storage the bandwidth extension model associated with the speaker.

7. The method of claim 6, further comprising outputting wideband speech after performing the wideband speech synthesis.

8. The method of claim 1, wherein performing bandwidth extension on the narrowband call is activated when wideband is not available and the call is taking place on narrowband.

9. An apparatus for bandwidth extension of a signal transmitted from a near-end station to a far-end station, comprising:
   means for receiving, at the far-end station, a wideband signal transmitted from the near-end station;
   means for generating a bandwidth extension model based on the received wideband signal transmitted by the near-end station with data of an identified speaker of the wideband signal; and
   means for performing bandwidth extension using the bandwidth extension model on a narrowband call including the identified speaker, wherein narrowband features from voice data in the narrowband call are extracted and mapped, using the bandwidth extension model, to personalized wideband features of the identified speaker.

10. The apparatus of claim 9, wherein the bandwidth extension model is personalized with the data of the identified speaker.

11. The apparatus of claim 9, wherein the bandwidth extension model is based on speaker-derivable information.

12. The apparatus of claim 9, wherein the means for generating the bandwidth extension model comprises means for training the bandwidth extension model with the data of the identified speaker.

13. The apparatus of claim 9, wherein the means for generating the bandwidth extension model comprises means for identifying the speaker and means for extracting wideband features from the wideband signal.

14. The apparatus of claim 9, wherein the means for performing bandwidth extension on the narrowband call comprises:
   means for identifying the speaker; and
   means for retrieving from storage the bandwidth extension model associated with the speaker.

15. The apparatus of claim 14, further comprising means for outputting wideband speech after performing the wideband speech synthesis.

16. The apparatus of claim 9, wherein performing bandwidth extension on the narrowband call is activated when wideband is not available and the call is taking place on narrowband.

17. A non-transitory computer-readable medium comprising instructions for performing bandwidth extension of a signal transmitted from a near-end station to a far-end station, wherein the instructions cause a computer to:
   receive, at the far-end station, a wideband signal transmitted from the near-end station;
   generate a bandwidth extension model based on the received wideband signal transmitted by the near-end station with data of an identified speaker of the wideband signal; and
   perform bandwidth extension using the bandwidth extension model on a narrowband call including the identified speaker, wherein narrowband features from voice data in the narrowband call are extracted and mapped, using the bandwidth extension model, to personalized wideband features of the identified speaker.

18. The computer-readable medium of claim 17, wherein the bandwidth extension model is personalized with the data of the identified speaker.

19. The computer-readable medium of claim 17, wherein the bandwidth extension model is based on speaker-derivable information.

20. The computer-readable medium of claim 17, wherein the instructions that cause the computer to generate the bandwidth extension model comprise instructions that cause the computer to train the bandwidth extension model with the data of the identified speaker.

21. The computer-readable medium of claim 17, wherein the instructions that cause the computer to generate the bandwidth extension model comprise instructions that cause the computer to identify the speaker and extract wideband features from the wideband signal.

22. The computer-readable medium of claim 17, wherein the instructions that cause the computer to perform bandwidth extension on the narrowband call comprise instructions that cause the computer to:
   identify the speaker; and
   retrieve from storage the bandwidth extension model associated with the speaker.

23. The computer-readable medium of claim 22, further comprising instructions that cause the computer to output wideband speech after performing the wideband speech synthesis.

24. The computer-readable medium of claim 17, wherein performing bandwidth extension on the narrowband call is activated when wideband is not available and the call is taking place on narrowband.

25. A system for bandwidth extension of a signal transmitted from a near-end station to a far-end station of communication, comprising:
   a receiver adapted to receive, at the far-end station, a wideband signal transmitted from the near-end station;
   a training module adapted to generate a bandwidth extension model based on the received wideband signal transmitted by the near-end station with data of an identified speaker of the wideband signal; and
   a processor for performing bandwidth extension using the bandwidth extension model on a narrowband call including the identified speaker, wherein narrowband features from voice data in the narrowband call are extracted and mapped, using the bandwidth extension model, to personalized wideband features of the identified speaker.

26. The system of claim 25, wherein the bandwidth extension model is personalized with the data of the identified speaker.

27. The system of claim 25, wherein the bandwidth extension model is based on speaker-derivable information.

28. The system of claim 25, wherein the training module is adapted to train the bandwidth extension model with the data of the identified speaker.

29. The system of claim 25, further comprising a feature extraction module adapted to identify the speaker and extract wideband features from the wideband signal.

30. The system of claim 25, wherein the processor is adapted to identify the speaker, and retrieve from storage the bandwidth extension model associated with the speaker.

31. The system of claim 30, wherein the processor is adapted to further output wideband speech after performing the wideband speech synthesis.

32. The system of claim 25, wherein performing bandwidth extension on the narrowband call is activated when wideband is not available and the call is taking place on narrowband.

* * * * *